United States Patent [19]
Menard

[11] 4,001,041
[45] Jan. 4, 1977

[54] PRESSURIZED FUEL CELL POWER PLANT

[75] Inventor: Maurice C. Menard, Enfield, Conn.

[73] Assignee: United Technologies Corportion, Hartford, Conn.

[22] Filed: Feb. 12, 1975

[21] Appl. No.: 549,597

[52] U.S. Cl. .................................. 429/17; 429/19
[51] Int. Cl.² ......................................... H01M 8/06
[58] Field of Search ............ 136/86 R, 86 A, 86 B, 136/86 C

[56] References Cited
UNITED STATES PATENTS

| | | | |
|---|---|---|---|
| 668,838 | 2/1901 | Lavison | 136/86 A |
| 1,182,759 | 5/1916 | Emanuel | 136/86 R |
| 3,112,229 | 11/1963 | Bacon et al. | 136/86 R |
| 3,311,097 | 3/1967 | Mittelsteadt | 123/119 |
| 3,404,529 | 10/1968 | Lagerstrom | 60/6 |
| 3,507,702 | 4/1970 | Sanderson | 136/86 R |
| 3,615,850 | 10/1971 | Chludzinski | 136/86 C |

*Primary Examiner*—John H. Mack
*Assistant Examiner*—H. A. Feeley
*Attorney, Agent, or Firm*—Stephen E. Revis

[57] ABSTRACT

A fuel cell power plant for producing electricity uses pressurized reactants in the cells. In one embodiment air for the fuel cells is compressed in a compressor driven by a turbine which is powered by waste energy produced in the power plant in the form of a hot pressurized gaseous medium. The power plant includes fuel conditioning apparatus comprising a steam reforming reactor and a reactor burner to provide heat for the steam reforming reactor. Effluent gases from the anode side of the cells are delivered into the reactor burner and from the reactor burner are combined with effluent gases from the cathode side of the cells. The combined gases are used to drive the turbine. Water to produce steam for the steam reforming reactor is recovered from the effluent gases from the anode side of the cells before they are delivered into the reactor burner and from the effluent gases from the cathode side of the cells.

14 Claims, 4 Drawing Figures

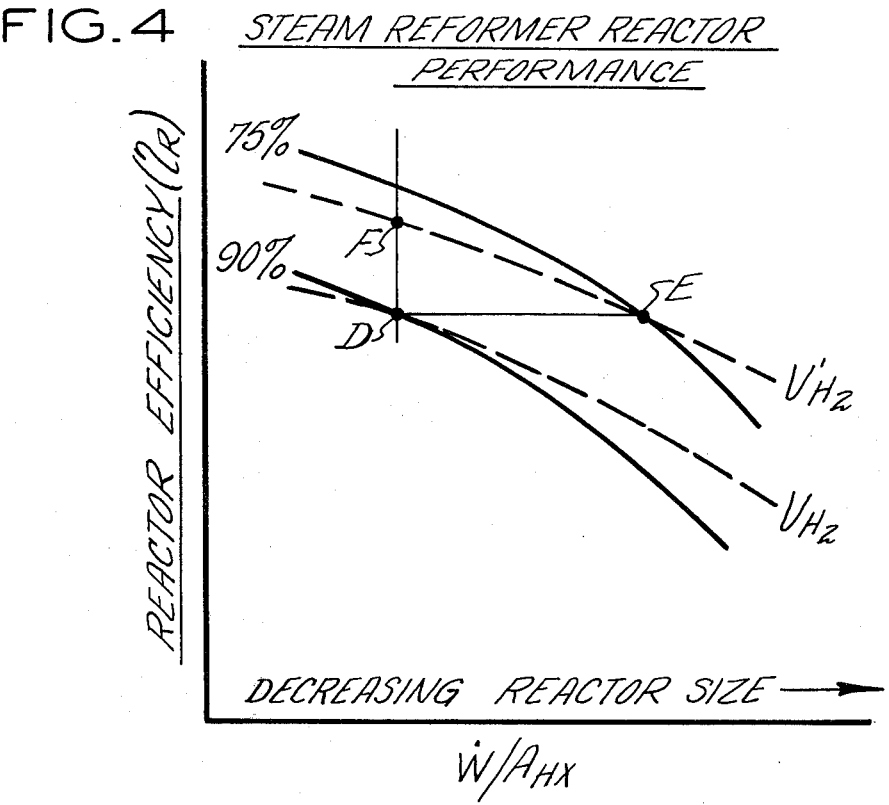
FIG. 4 STEAM REFORMER REACTOR PERFORMANCE
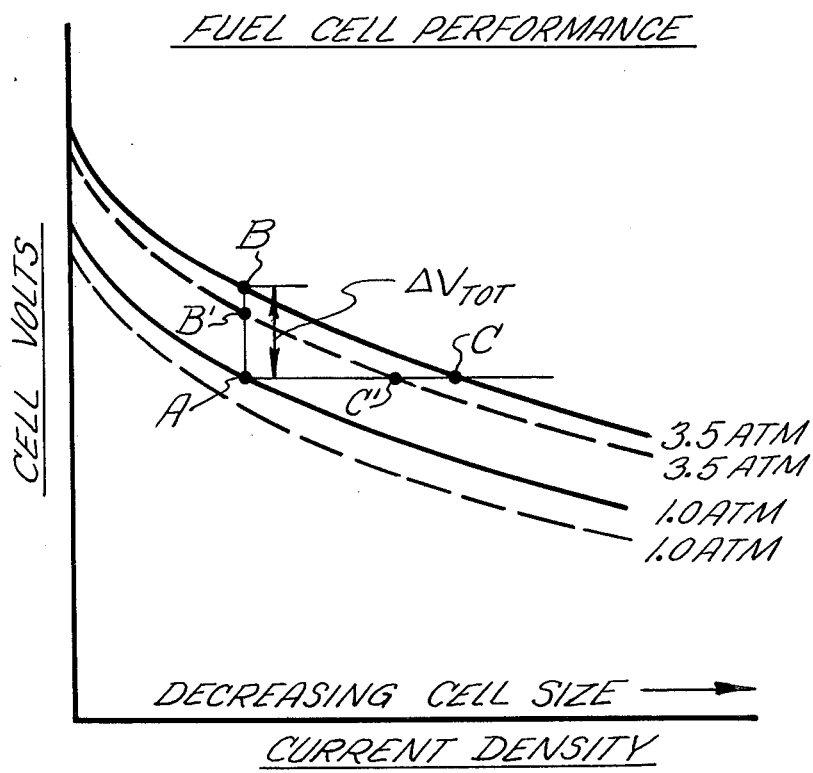
FIG. 3 FUEL CELL PERFORMANCE

PRESSURIZED FUEL CELL POWER PLANT

BACKGROUND OF THE INVENTION

1. Field of the Invention

This invention relates to power plants and more particularly to electricity producing power plants utilizing fuel cells as the power source.

2. Description of the Prior Art

In the fuel cell art there have been three general approaches to improving fuel cell performance. One approach is to increase the temperature at which the fuel cell operates. This approach, however, is limited by material corrosion and, in acid electrolyte cells, by acid evaporation. A second approach is to attempt to increase the amount of catalyst per square inch of electrode surface area. This approach, however, is limited by the increased expense and practical limitations in the amount of catalyst that can possibly be put on a certain area of electrode. A third approach is to increase the pressure of the reactants within the fuel cell. It is well known in the art that fuel cells perform better as reactant pressures increase. One of the major stumbling blocks to this approach is that it requires considerable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing high power pressure reactants in the fuel cell stack. For the foregoing reasons, up to the present time, these fuel cell power plants have always used reactants at atmospheric pressures.

RELATED APPLICATIONS

The following applications, filed on even data herewith and of common assignee, pertain to subject matter related to the present invention:

1. "Pressurized Fuel Cell Power Plant" by D. Bloomfield and R. Cohen, U.S. Ser. No. 549,600
2. "Pressurized Fuel Cell Power Plant" by D. Bloomfield, U.S. Ser. No. 549,601
3. "Pressurized Fuel Cell Power Plant With Air Bypass" by M. Landau, U.S. Ser. No. 549,598
4. "Pressurized Fuel Cell Power Plant With Steam Flow Through The Cells" by D. Bloomfield and M. Landau, U.S. Ser. No. 549,596
5. "Pressurized Fuel Cell Power Plant With Single Reactant Gas Stream" by D. Bloomfield, U.S. Ser. No. 549,602
6. "Pressurized Fuel Cell Power Plant With Steam Powered Compressor" by D. Bloomfield, U.S. Ser. No. 549,599

SUMMARY OF THE INVENTION

One object of the present invention is an economically attractive fuel cell power plant.

Another object of the present invention is a more efficient fuel cell power plant.

A further object of the present invention is a fuel cell power plant which, when compared to a prior art fuel cell power plant of similar capacity, is smaller in size and has lower overall hardware costs.

Accordingly, the present invention is an electricity generating power plant using fuel cells wherein air is supplied to the fuel cells under pressure from a compressor which is driven, at least in part, by energy from the fuel cell effluent gases and fuel conditioning apparatus effluent gases. The anode effluent gases pass through condensing apparatus and thereupon into a burner for the steam reforming reactor of the fuel conditioning apparatus, whereupon the effluent gases from the reactor burner are combined with the effluent gases from the cathode gas space and the combined gases are delivered into the turbine.

Condensing water out of the anode effluent gas stream prior to passing it through the burner of the fuel conditioning apparatus eliminates the need for large and expensive regenerator (i.e., heat exchanger) apparatus. This is only possible due to the high pressure of the anode effluent gas stream. At atmospheric pressures the dew point of the anode effluent gas stream is so low that it is either impossible to condense out sufficient water (using ambient cooling air) or extremely large condensing apparatus is required. Also, by condensing the water out of the anode effluent gas stream prior to its entering the reactor burner rather than after it leaves the reactor burner permits a reduction in its size, and eliminates what would otherwise be an extremely large regenerative heat exchanger as will be hereinafter explained in more detail.

Since the electrical energy output from the cell stack is not used to pressurize the oxidant, there is no need to increase the size of the fuel stack in order to maintain power plant capacity. As a matter of fact, full advantage can be taken of the performance improvement in the fuel cell stack such that the stack may produce even more electrical energy without an increase in its size.

Furthermore, other heretofore unrecognized benefits arise throughout the power plant to further enhance the attractiveness of a fuel cell power plant designed according to the present invention. For example, one advantage of the present invention is that it permits reduction in the size of the condensing apparatus of the power plant by a factor of about two or three. This is particularly significant since the condensing apparatus of prior art fuel cell power plants occupies a volume about as large as the fuel cell stack and fuel conditioning apparatus combined.

Another advantage of the present invention is that it permits a reduction in the size of the stream reforming reactor (i.e., part of the fuel conditioning apparatus) of the power plant by a factor of about two as compared to the steam reforming reactor used in a prior art fuel cell power plant of similar capacity.

The foregoing and other objects, features and advantages of the present invention will be more fully explained and will become more apparent in the light of the following detailed description of preferred embodiments thereof as illustrated in the accompanying drawing.

BRIEF DESCRIPTION OF THE DRAWING

FIG. 3 is a graph illustrating the performance of fuel cells used in power plants of the present invention.

FIG. 4 is a graph illustrating the performance of steam reforming reactors used in power plants of the present invention.

DESCRIPTION OF THE PREFERRED EMBODIMENTS

Figure 1:
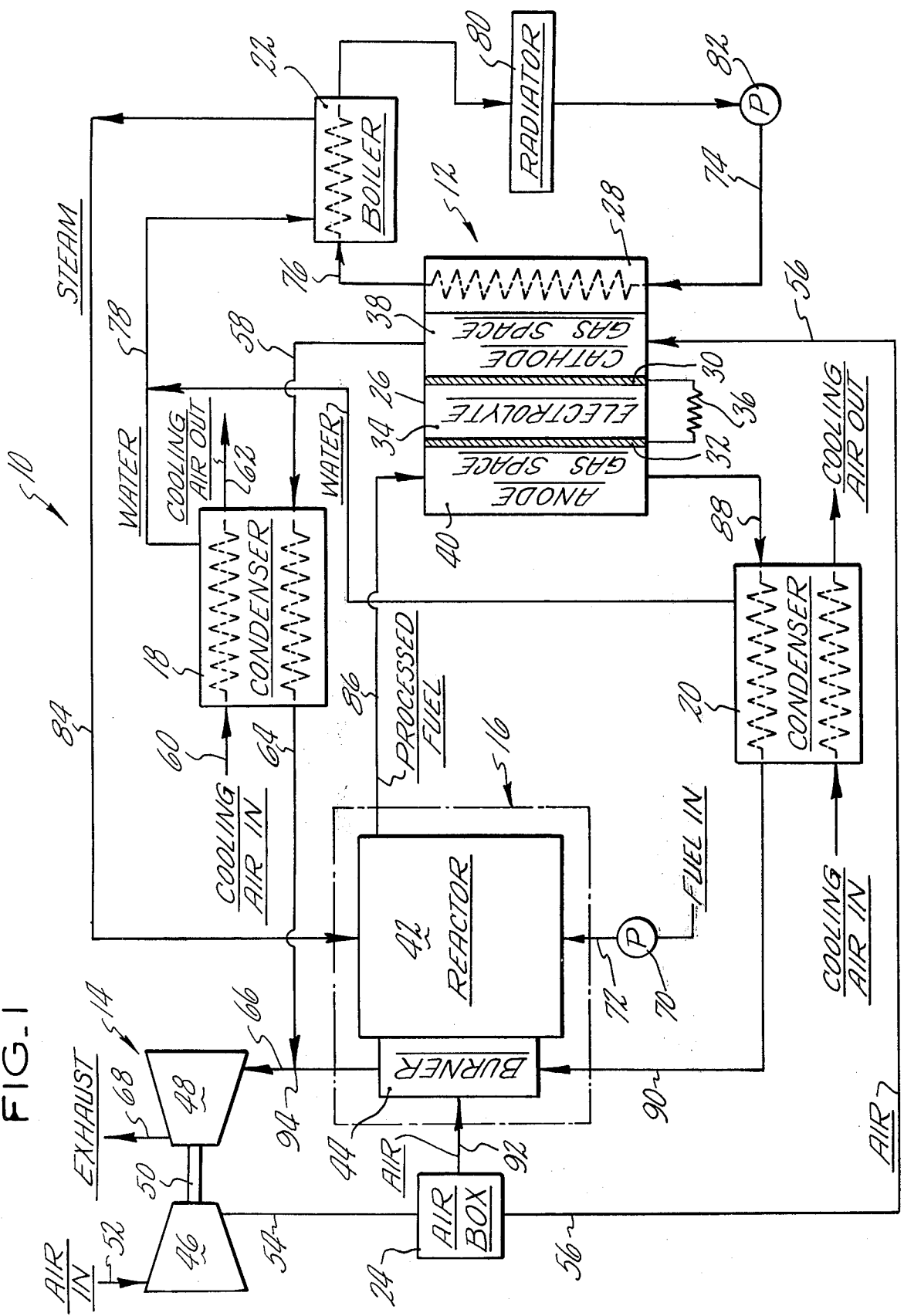
FIG. 1 is a schematic representation of a power plant according to the present invention.

Consider, as an exemplary embodiment of the present invention, the power plant depicted schematically in FIG. 1. The power plant is generally designated by the numeral 10 and includes a fuel cell stack generally designated by the numeral 12, a turbocharger generally designated by the numeral 14, fuel conditioning apparatus generally designated by the numeral 16, condensers 18, 20, a boiler 22, and an air flow splitter or air control box 24. The fuel cell stack 12 may comprise any conventional type of fuel cells which operate on gaseous reactants. In this embodiment the oxidant is assumed to be air and the fuel is assumed to be hydrogen, however, the present invention is not intended to be limited to any particular oxidant or to any particular hydrogen containing gas. The stack 12 will generally comprise a plurality of fuel cells connected in series electrically through a load, but is herein depicted as only comprising a single cell 26 for the purpose of clarity and a thermal management portion 28. As herein shown each cell includes a cathode electrode 30 spaced from an anode electrode 32 and including an electrolyte retaining matrix 34 therebetween. In this preferred embodiment the electrolyte is liquid phosphoric acid but the invention is not intended to be limited thereto and base electrolytes as well as solid types of electrolytes such as metal oxide electrolytes or solid polymer electrolytes are contemplated as being useful in a power plant designed according to the present invention. The electrodes 30, 32 are connected in series through a load 36. Each cell 26 also includes a cathode gas space 38 on the nonelectrolyte side of the cathode electrode 30 and an anode gas space 40 on the nonelectrolyte side of the anode electrode 32. In this embodiment the fuel conditioning apparatus 16 comprises a steam reformer reactor 42 and a reactor burner 44 but it may also include other equipment such as a selective oxidizer and shift converter for example. The requirements of the fuel conditioning apparatus are dependent in part upon the type of raw fuel being used and upon the particular design of the cells in the fuel cell stack. Indeed, the fuel conditioning apparatus may include a partial oxidation hydrogen generator instead of a steam reforming reactor and reactor burner. The turbocharger 14 comprises a compressor 46 driven by an exhaust turbine 48 through a shaft 50, and will be described hereinafter in more detail as will other components of the power plant 10.

Still referring to FIG. 1, in operation air enters the compressor 46 via a conduit 52 and is compressed. Any pressure greater than atmospheric pressure will yield some benefits as compared to unpressurized power plants; however, about two or more atmospheres of pressure are desirable in order that substantial benefits are realized for the total power plant. This pressurized air enters the air control box 24 via a conduit 54. The air box 24 includes controls and valves for properly proportioning the air flow to various components. A portion is directed into the cathode gas space 38 via a conduit 56 and is electrochemically reacted within the cathode electrode 30 with the phosphoric acid electrolyte in the matrix 34 to produce electricity and water, some of the water being evaporated back into the air stream flowing through the cathode gas space 38. The moist cathode effluent leaves the gas space 38 via a conduit 58 and passes through a condenser 18. Cooling air enters the condenser 18 via a conduit 60 and leaves in a heated condition via a conduit 62. Within the condenser 18 the cathode effluent is cooled to the point where water condenses out and is collected for use in the fuel conditioning apparatus 16 as will be hereinafter discussed. The cathode effluent leaves the condenser via a conduit 64, is combined with the effluent from the reactor burner 44, and is delivered into the exhaust turbine 48 via a conduit 66 providing the energy to power the turbine 48 which in turn drives the compressor 46. After passing through the turbine 48 any further energy in the gas stream may be either thrown away via a conduit 68 or may be used elsewhere in the power plant.

On the anode side, a hydrogen containing liquid fuel such as naphtha, which has been increased in pressure by a pump 70 to at least the same pressure as the oxidant entering the cathode gas space 38, enters the reactor 42 via a conduit 72 whereupon it is mixed with steam from the boiler 22 in the presence of a catalyst. Although not shown, it is preferable that the fuel be in atomized form as it enters the reactor 42. In this embodiment it is contemplated that naphtha will be used as the raw fuel and that the steam reforming reactor 42 will be of the well known type which utilizes a nickel catalyst; however, this invention is not intended to be limited to any particular fuel or catalyst.

The boiler 22 may be provided with its own burner and fuel supply if desired, but as herein shown in this preferred embodiment the boiler 22 is run on waste heat produced by the stack 12. As shown, a liquid coolant, such as silicone oil or water, enters the thermal management portion 28 of the stack 12 via a conduit 74, picks up waste heat generated by the stack 12 and leaves via a conduit 76. Water from the condenser 18 and from the condenser 20 is introduced into the boiler 22 via a conduit 78. The coolant fluid enters the boiler 22 and gives up its heat to the water to the boiler to produce steam. The coolant fluid leaves the boiler 22 and enters a radiator 80 where additional heat may be rejected before the coolant is pumped back to the stack 12 by a pump 82. Steam from the boiler 22 is introduced into the reactor 42 via a conduit 84.

Processed fuel in the form of hydrogen gas and possibly some impurities leaves the steam reforming reactor 34 by means of a conduit 86 whereupon it enters the anode gas space 40 of the fuel cell 26 and electrochemically reacts with the electrolyte. In this embodiment the anode gas stream is contemplated as being at about the same pressure as the cathode gas stream in order to minimize the risk of gas crossover between the anode and cathode gas spaces. The anode effluent gas stream leaves the anode gas space 40 by means of a conduit 88 and is delivered into the condenser 20 which operates in the same manner as the condenser 18. The relatively dry effluent from the condenser 20 is delivered into the reactor burner 44 via a conduit 90 whereupon it is combined with air from the air box 24 via a conduit 92 and is burned to provide heat for the steam reforming reactor 42. Effluent from the burner 44 is combined at a point 94 with the effluent from the condenser 18, and the combined gases are delivered into the exhaust turbine 48 via the conduit 66.

In this embodiment waste energy from the fuel conditioning apparatus is delivered to the turbine 46 by passing the reactor burner effluent gases into the turbine. If the power plant had no steam reforming reactor and thus no reactor burner other means would have to be provided for delivering waste energy from the fuel conditioning apparatus into the turbine, such as by a heat exchanger in operable relationship with the fuel conditioning apparatus and with any other gas stream being delivered into the turbine.

As heretofore mentioned, a power plant designed according to the present invention can operate using a condenser considerably smaller than the condensers of prior art fuel cell power plants. At a constant current there is a constant amount of water produced by the fuel cell according to Faraday's law. This water leaves the cell in the cathode effluent gas stream. The effluent from the anode gas space also includes water. If a power plant must operate without a separate water supply, then all the water for the steam reforming reactor must be recovered from the effluent gases of the power plant. In the present invention, as well as in the prior art, part of this water is recovered from the cathode effluent gas stream by a condenser. In prior art phosphoric acid electrolyte power plants wherein the gas stream is at atmospheric pressure the dew point of the stream is so low that in order to condense out a sufficient amount of water to run the steam reformer reaction the temperature of the gas stream leaving the condenser must necessarily be only a few degrees higher than the ambient cooling air. Accordingly, very large condensers are required. As heretofore stated the condensers are the largest components of prior art fuel cell power plants. In pressurized power plants according to the present invention the dew point of the gas stream leaving the cathode gas space will be considerably higher than in the prior art due to the higher pressure of the gas stream. For example, the dew point of a gas stream leaving a 300° F stack at 45 psia would be about 60° F higher than the dew point of a gas stream leaving a 300° F stack at atmospheric pressure. This means that to condense out the same amount of water the temperature of the gas stream need not be reduced to as low a level as in unpressurized systems. In other words there will be significant difference between the temperature of the condenser cooling air and the temperature of the gas stream leaving the condenser. Assuming the pressurized and unpressurized systems both use 90° F cooling air, it is estimated that the condenser size may be reduced by a factor of about two or three. This reduction in size of the condenser equipment is one of the major advantages of the present invention and helps to significantly reduce the cost of the power plant. Although not shown, it may be desirable to pass the effluent from the cathode gas stream first through a regenerative heat exchanger to reduce its temperature before it enters the condenser. After leaving the condenser it would again pass through the same regenerative heat exchanger and recover heat before it is delivered into the turbine. This would reduce the amount of heat wasted in the condenser but would add the complexity and cost of a regenerator. Whether or not a regenerator is used would involve a trade off study and would depend upon the particular goals of the power plant in question.

Usually sufficient water for the steam reforming reactor cannot be obtained from the cathode gas space alone. This is particularly true of prior art power plants. In prior art fuel cell power plants using unpressurized reactants additional water would be recovered from the reactor burner effluent gas stream. In the present invention the additional water necessary for the steam reforming reactor is recovered from the anode gas space effluent prior to its entering the reactor burner. In prior art unpressurized fuel cell power plants this could not be done because the amount of water condensed out of the anode gas space effluent in combination with the water recovered from the cathode gas space effluent is still insufficient for the steam reforming reactor; the condensing apparatus was instead positioned downstream of the reactor burner in order that the additional water produced in the reactor burner could be recovered along with water in the anode gas space effluent. That arrangement presented additional problems because the very high temperature of the reactor burner effluent required the use of a very large regenerative heat exchanger to reduce the temperature of the gases prior to their entering the condenser. The elimination of the need for such a regenerative heat exchanger is an important advantage of the present invention. The higher dew point (due to higher pressures) of the anode gas space effluent gases in the power plant of the present invention permits a sufficient amount of water to be recovered from the anode gas space effluent (before it passes into the reactor burner) with reasonably sized condensing apparatus such that, when combined with water recovered from the cathode gas space effluent gases, there is sufficient water for the steam reforming reactor. Removing water from the anode gas space effluent before it enters the reactor burner also helps to reduce the size of the steam reforming reactor due to the higher temperatures available in the burner as a result of removal of most of the water vapor from the stream.

Another important feature of this invention, as illustrated in the foregoing embodiment, is that the heat in both the cathode gas stream effluent, the anode gas stream effluent, and the reactor burner effluent is completely utilized by combining the burner effluent with cathode gas stream effluent and delivering the combined gases into the turbine. Further, the pressures in the anode and cathode gas spaces 38, 40 are more easily kept equivalent in view of the fact that these streams are effectively joined at 94, and must, of course, have the same pressure at 94. The pressure regulators usually required for this purpose may be eliminated.

Figure 2:
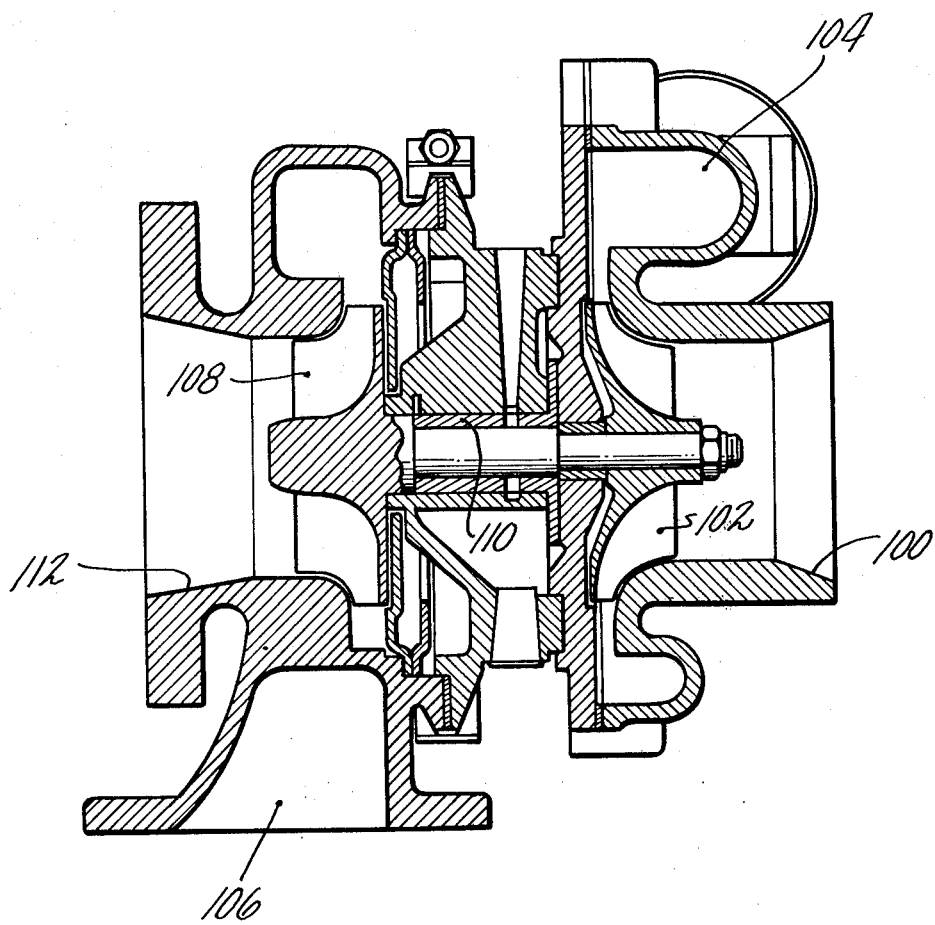
FIG. 2 is a cross-sectional view of a turbocharger which may be used in power plants of the present invention.

As an example of a turbocharger suitable for use in a power plant designed according to the present invention, consider the turbocharger shown in FIG. 2. Ambient air enters a compressor duct 100 and impinges upon a single stage centrifugal impeller 102 which imparts a velocity head to the air. The high velocity air flows into a diffuser 104 where the velocity head is changed to a pressure head. In the embodiment of FIG. 1 the compressed air would leave the diffuser 104 via the conduit 54 and, after passing through the air box 24, would be introduced into the cathode gas space 38. On the other side, hot gases enter a turbine inlet 106 (such as from conduit 66 in FIG. 1) and flow through a centrifugal turbine rotor 108 which converts the thermal energy of the gas stream to shaft horsepower to drive a shaft 110 connected to the compressor impeller 102. The gases are exhausted via a turbine outlet duct 112.

The turbocharger pictured in FIG. 2 is only illustrative of the type of device preferred for use in the power plants of the present invention. Any commercially available turbocharger of a size sufficient to provide the required flow rate and pressure needed by the fuel cell stack chosen for use in the power plant may be used. For example, for a 1200 kilowatt power plant wherein it is desired that the reactant gases to the fuel cell stack are to be at about 3.5 atmospheres pressure, a Brown Boveri Model RR150 turbocharger would be suitable. This particular model has the capability of providing a mass flow rate of up to 3 lb/sec at 50 psia.

Although what is pictured in FIG. 2 is representative of what is typically referred to in the art as a "turbocharger" the present invention is not intended to be limited thereto but may be any apparatus which uses the energy of a hot pressurized gaseous medium (typically exhaust gases) to compress another gas. For example, any heat engine capable of driving a compressor and which itself may be powered by a hot pressurized gas stream may be used. Also, a Comprex (registered trademark of Brown Boveri & Company, Ltd., Bade, Switzerland) supercharger which compresses air by direct transmission of energy from an expanding gas utilizing compression and expansion waves, or other device which works on similar principles, may be used. The Comprex supercharging concept is well known in the art and is more fully described in a ASME paper No. 58-GTP-16 titled "The Comprex . . . A New Concept of Diesel Supercharging" by Max Berchtold and F. J. Gardiner published in March 1958.

In order to more fully appreciate and understand other advantages and the operation of the present invention, consider the graph of FIG. 3 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating on oxygen and hydrogen there is thus oxygen utilization ($U_{O_2}$) at the cathode and hydrogen utilization ($U_{H_2}$) at the anode. Raising reactant utilization automatically lowers the partial pressure of the reactants seen by the anode and the cathode since more reactants are taken out of the gas stream per pound of mass flow through the cell; thus, the average amount of reactant in the gas stream over the surface of the electrode is less from the inlet to the outlet. The curve labeled 1.0 atmosphere in FIG. 3 represents cell performance at a particular hydrogen utilization and oxygen utilization. The solid curve labeled 3.5 atmospheres represents cell performance at the same reactant utilization ratio. Also, the cells represented by each of these curves is assumed to be operating at the same temperature. The well known Tafel equation states that there will be an increase in cathode performance (i.e., an increase in voltage) when the partial pressure of oxygen increases. This equation is set forth below.

$$\Delta V_{cathode} = K(mv) \log \left[ \frac{P_{O_2}}{P_{O_2(ref)}} \right] \quad (1)$$

where $K$ is a constant. The Nernst equation states that there will be an increase in anode performance (i.e., an increase in cell voltage) when the partial pressure of hydrogen is increased. The Nernst equation is set forth below.

$$\Delta V_{anode} = C(mv) \ln \left[ \frac{P_{H_2}'}{P_{H_2(ref)}} \right] \quad (2)$$

where $C$ is constant. It is apparent that for constant temperature and for constant utilization, an increase in the total pressure of the reactants results in an increase in the partial pressure of both reactants leading to an improvement in both cathode and anode performance. The total improvement in fuel cell performance may be simply stated as follows:

$$\Delta V_{total} = \Delta V_{cathode} + \Delta V_{anode} \quad (3)$$

The left hand side of equation (3) is illustrated by the graph of FIG. 3 as the difference in voltage between points A and B at constant current density. Further, from the graph of FIG. 3, it can be seen that by operating at reactant pressures of 3.5 atmospheres the cell size may be decreased without decreasing the cell voltage output such as by operating at point C.

The dotted curves on the graph of FIG. 3 are also representative of cell performance at 1.0 and 3.5 atmospheres of reactant pressure, respectively, as labeled. These curves represent the performance of cells similar in all respects to cells represented by the solid curves except that the cells have been designed for higher reactant utilization. Note that at 3.5 atmospheres the cell can run at a higher reactant utilization and still show improvement over the prior art such as an increase in cell voltage by operating at point B' or an increase in current density (i.e., a decrease in cell size) for the same cell voltage by operating at point C'. On the other hand, notice that for a cell using reactants at atmospheric pressure an increase in utilization means either increasing the size of the cell to maintain the same cell voltage or taking a voltage loss in order to maintain the same cell size. The importance of the ability to operate at higher hydrogen utilization without sacrificing performance or increasing the size of the cell will become apparent in the hereinafter set forth discussion relating to the operation of the steam reformer reactor 34 of the power plant of the preferred embodiment.

In prior art phoshoric acid electrolyte fuel cells operating over 300° F and at atmospheric pressures evaporation of the phosphoric acid electrolyte occurs. The effect of acid evaporation is to require that acid be added regularly during the lifetime of the power plant. Acid evaporation is a function of the mass flow rate of air through the cathode gas space, the partial pressure of acid, and the total gas pressure in the cathode gas space according to the following relationship:

$$\text{Acid loss} = f \left( \text{flow rate} \times \frac{\text{vapor pressure of acid}}{\text{total pressure}} \right) \quad (4)$$

From the foregoing formula it is apparent that increasing the total pressure of the gases flowing through the cathode gas space reduces acid loss. It is also a fact that increasing the total pressure results in a decrease in the vapor pressure of the acid due to dilution of the electrolyte, further reducing acid loss. Also, due to the higher reactant pressures fuel cells incorporated in power plants of the present invention may be run at higher oxygen utilizations, and therefore the flow rate of air through the cathode gas space is lower and acid loss is further reduced. It has been determined that the foregoing factors combined reduce acid loss by the order of magnitude.

A graph representative of a steam reformer reactor performance is shown in FIG. 4. Reformer efficiency ($\eta_R$) is plotted on the vertical axis and the flow rate of the processed gas stream ($\dot{W}$) divided by the heat transfer area of the reactor ($A_{hx}$) is plotted on the horizontal axis. Since the term $A_{hx}$ is directly related to the size of the reactor, reformer size decreases when moving to the right along the horizontal axis. Reformer efficiency is defined by the following equation:

$$\eta_R = (K) \, U_{H_2} \, (\alpha \cdot \beta) \quad (5)$$

where $K$ is a constant, $U_{H_2}$ is hydrogen utilization in the fuel cell, and the product ($\alpha \cdot \beta$) is fuel conversion in the reactor. Fuel conversion ($\alpha \cdot \beta$) is the percent of carbon in the incoming fuel which is converted to $CO_2$. It is representative of the amount of hydrogen produced in the steam reforming reaction. Shown in the graph of FIG. 4 are 90% and 75% fuel conversion curves along with a hydrogen utilization curve labeled $U_{H_2}$ and a hydrogen utilization curve labeled $U'_{H_2}$, the latter representing a higher hydrogen utilization. For the purposes of comparison assume that $U_{H_2}$ is the same hydrogen utilization as represented by the solid curves in FIG. 3 and that $U'_{H_2}$ is the hydrogen utilization represented by the dotted curves of FIG. 3. As discussed with reference to FIG. 3, fuel cells using reactants at atmospheric pressure were constrained to operate at a particular hydrogen utilization $U_{H_2}$ in order to achieve a certain cell voltage for a particular cell size (i.e., such as operating at point A). Having chosen a particular hydrogen utilization it is thus required that the operation of the steam reformer reactor must be somewhere along the hydrogen utilization curve $U_{H_2}$. It is thus a matter of choosing the best combination of reformer efficiency and reformer size for the particular cell. Generally in order to keep reformer size within reasonable limits, fuel conversion in prior art reactors is commonly around 90%. This would put the operation of the steam reformer reactor used with prior art fuel cells at point D. It now becomes clear why it is so important to be able to run the fuel cell at a higher hydrogen utilization. For example, in a power plant designed according to the present invention it is now possible to operate along the curve $U'_{H_2}$. This permits the use of a smaller steam reformer reactor without sacrificing efficiency because the reformer can be run at a lower fuel conversion. This operating point is labeled E in FIG. 4. Of course, if desired, reactor size can be kept the same and reformer efficiency can be greatly improved such as by operating at point F. It is important to note that although there is some loss in fuel cell performance when operating at higher utilizations (see FIG. 3) the fuel cell performance picture is still greatly improved; and, in addition, significant improvements can also be realized in the steam reformer reactor. This is contrary to prior art power plants wherein although a higher reactant utilization in the fuel cell could result in benefits for the steam reformer reactor, these benefits are offset by the detrimental effect on fuel cell performance.

With regard to designing a power plant according to the present invention, it will, of course, be necessary to trade off between seeking improvements in reactor performance and seeking improvements in fuel cell performance. Thus, the reactant utilization, cell size, cell output voltage, reactor size, reactor efficiency, and reactor fuel conversion rate are chosen depending upon the particular goals of the power plant being designed.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A power plant for generating electricity comprising:
   a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
   compressor means for compressing air to greater than two atmospheres pressure including a compressor and turbine means operably connected to said compressor;
   means for delivering air at a pressure of at least two atmospheres from said compressor into said cathode gas space;
   fuel conditioning apparatus including a reactor for producing hydrogen from a hydrogen containing fuel and steam;
   burner means for providing heat to said reactor;
   means for producing steam and for delivering said steam into said reactor;
   means for delivering pressurized hydrogen containing fuel into said reactor;
   means for delivering pressurized hydrogen from said fuel conditioning apparatus into said anode gas space;

condenser means disposed upstream of said turbine means for condensing out water from said anode gas space and cathode gas space effluent gases at least a first portion of said condenser means being disposed downstream of said anode gas space and upstream of said burner means;

means for delivering said anode gas space effluent gases into said first portion of said condenser means for recovering water therefrom;

means for delivering said cathode gas space effluent gases into said condenser means for recovering water therefrom;

means for delivering said anode gas space effluent gases from said condenser means into said burner means;

means for delivering the condensed out water from said condenser means to said means for producing steam; and means disposed downstream of said condenser means for delivering effluent gases from said cathode gas space and burner means into said turbine means for powering said turbine means and driving said compressor.

2. The power plant according to claim 1 including means for delivering compressed air from said compressor into said burner means.

3. The power plant according to claim 1 wherein said electrolyte is an acid electrolyte.

4. The power plant according to claim 3 wherein said electrolyte is phosphoric acid.

5. The power plant according to claim 1 wherein said means for producing steam includes boiler means for converting water into steam, wherein said means for delivering condensed out water from said condenser means to said means for producing steam includes means for delivering water from said condenser means into said boiler means.

6. The power plant according to claim 5 wherein said means for producing steam includes means for delivering a coolant fluid into heat exchange relationship with said stack and with said boiler means for transferring heat from said stack to said boiler means.

7. In the process for generating electricity in a power plant comprising a compressor operably connected to turbine means, fuel conditioning apparatus comprising a reactor, and a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode, the steps of:

compressing air to greater than two atmospheres pressure in said compressor;

delivering said compressed air at greater than two atmospheres from said compressor into said cathode gas space;

delivering pressurized hydrogen containing fuel into said reactor;

producing hydrogen by reacting steam with a hydrogen containing fuel;

burning anode effluent gases in a burner to provide heat for said step of producing hydrogen;

condensing water out of said cathode gas space effluent gases upstream of said turbine means;

condensing water out of said anode gas space effluent gases before the step of burning said anode effluent gases;

converting said condensed out water from said cathode and anode gas space effluent gases into steam and delivering said steam into said reactor for use in said step of producing hydrogen;

delivering pressurized hydrogen from said fuel conditioning apparatus into said anode gas space; and delivering effluent gases from said cathode gas space and effluent gases from said burner into said turbine means for powering said turbine means and driving said compressor.

8. The power plant according to claim 7 wherein said step of converting said condensed out water to steam includes the step of converting said water to steam using waste heat from said stack.

9. The power plant according to claim 1 wherein said reactor is a steam reforming reactor.

10. The power plant according to claim 9 wherein said burner means is a reactor burner.

11. The power plant according to claim 1 wherein said means for delivering effluent gases into said turbine means includes means disposed upstream of said turbine means for combining said cathode gas space effluent gases and said burner means effluent gases.

12. The process according to claim 7 wherein said step of producing hydrogen includes steam reforming said hydrogen containing fuel.

13. The process according to claim 7 including delivering compressed air from said compressor into said burner.

14. The process according to claim 8 wherein said step of converting water to steam includes delivering said water into a boiler and delivering a coolant fluid into heat exchange relationship with said stack and with said boiler means for transferring heat from said stack to said boiler means.

* * * * *

UNITED STATES PATENT OFFICE
CERTIFICATE OF CORRECTION

PATENT NO. : 4,001,041
DATED : January 4, 1977
INVENTOR(S) : Menard, Maurice C.

It is certified that error appears in the above-identified patent and that said Letters Patent are hereby corrected as shown below:

Column 1, line 53: delete "power" (second occurrence).

Column 2, line 50: after "fuel" insert --cell--.

Column 9, line 34: "$(\overset{\bullet}{W})$" should be --$(\dot{W})$--.

Signed and Sealed this

Fifteenth Day of March 1977

[SEAL]

Attest:

RUTH C. MASON
Attesting Officer

C. MARSHALL DANN
Commissioner of Patents and Trademarks